Dec. 9, 1952     A. G. DE REVEY     2,620,707
OPHTHALMIC MOUNTING, INCLUDING
DETACHABLE LENS CONNECTIONS
Filed Dec. 29, 1948
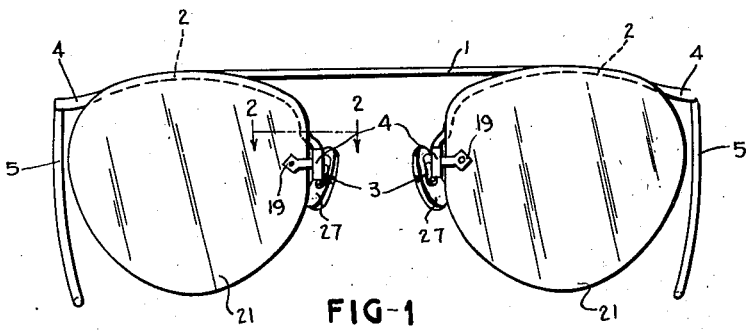
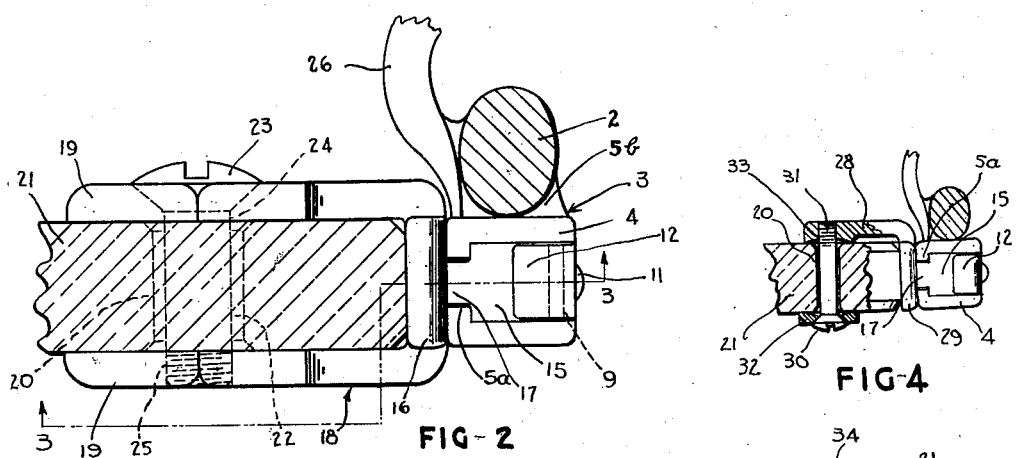
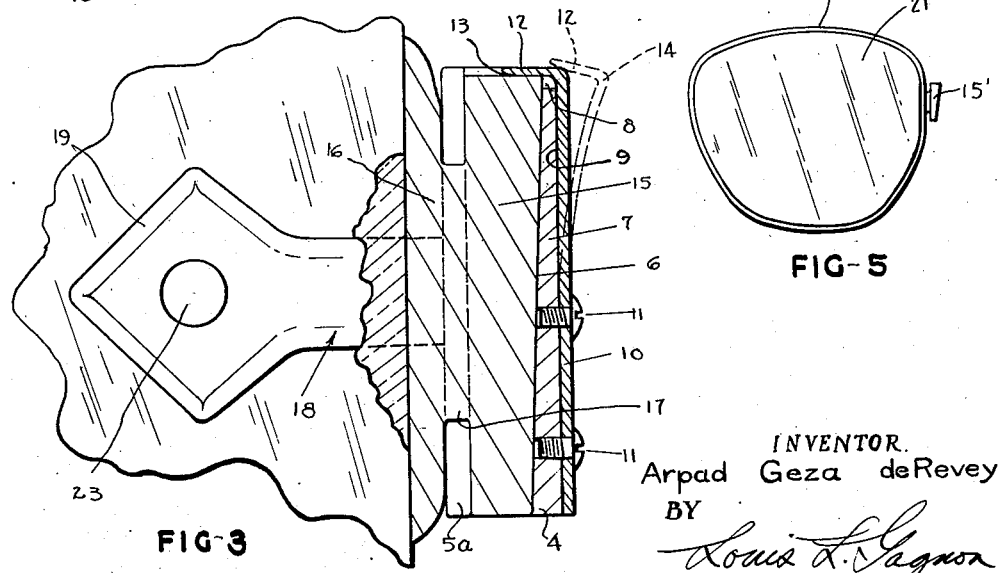
INVENTOR.
Arpad Geza deRevey
BY
Louis L. Gagnon
ATTORNEY Patented Dec. 9, 1952

2,620,707

UNITED STATES PATENT OFFICE 2,620,707

OPHTHALMIC MOUNTING, INCLUDING DETACHABLE LENS CONNECTIONS

Arpad Geza de Revey, Peoria, Ill., assignor to American Optical Company, Southbridge, Mass., a voluntary association of Massachusetts Application December 29, 1948, Serial No. 67,859

6 Claims. (Cl. 88—41)

This invention relates to ophthalmic mountings and has particular reference to an ophthalmic mounting embodying a lens supporting structure to which lenses may be detachably connected and supported in proper aligned relation with the associated parts of the mounting in a simple and efficient manner whereby lenses possessing different characteristics may be employed with a single supporting structure and method of making the same.

One of the principal objects of the invention is to provide an ophthalmic mounting embodying a lens supporting structure having connection means on the nasal sides thereof and a plurality of lenses possessing different characteristics may be provided with connection means which may be quickly and easily assembled with the connection means of the lens supporting structure and supported in position of use whereby said lenses may be selectively used with said supporting structure as required and has particular reference to a novel method of making the same.

Another object is to provide an ophthalmic mounting of the above character with rimless type lenses for use with a supporting structure wherein the said lenses are separately provided with connection means which may be quickly and easily assembled with connection means provided on the supporting structure, with said lenses having different desirable characteristics and being selected for use with said supporting structure according to the use to which the mounting is to be put.

Another object is to provide a lens supporting structure of the above nature embodying connection means with which lenses possessing different characteristics may be quickly and easily detachably connected with the connection means of the supporting structure and locked in position of use without requiring separate connection means.

Another object is to provide interfitting connection means carried by the lens supporting structure and the lenses, whereby the parts may be slidingly positioned in assembled relation with each other, in combination with resilient means for locking the parts in said relation.

Other objects and advantages of the invention will become apparent from the following description taken in connection with the accompanying drawing and it will be understood that many changes may be made in the details of construction, arrangement of parts and method shown and described without departing from the spirit of the invention as set forth in the accompanying claims. I, therefore, do not wish to be limited to the exact arrangement of parts, details of construction, and method shown and described as the preferred forms have been shown only by way of illustration and not in a limiting sense.

Referring to the drawings:

Fig. 1 is a front elevational view of an ophthalmic mounting embodying the invention;

Fig. 2 is an enlarged fragmentary sectional view taken approximately on line 2—2 of Fig. 1 and looking in the direction indicated by the arrows;

Fig. 3 is a fragmentary sectional view taken on line 3—3 of Fig. 2 and looking in the direction indicated by the arrows;

Fig. 4 is a reduced view similar to that of Fig. 2 illustrating a modified form of the invention; and Fig. 5 is a front elevational view of a lens and its associated supporting means and connection means illustrating a further modification of the invention.

It has been found desirable in many instances in the past to have available ophthalmic mountings possessing different characteristics. For example, some wearers of ophthalmic mountings, in instances when they require different corrections for distance vision and reading vision, prefer to have an ophthalmic mounting embodying only the distance corrective power in single vision type lenses and to have a separate mounting embodying the corrective power for near vision in single vision type lenses. This necessitates the forming of two separate and complete mountings possessing the optical characteristics required for the distance and near vision corrections. Other mountings such as mountings embodying absorptive lenses for outdoor use, particularly for protection against sun glare and the like, also necessitated the use of an additional complete mounting. Such latter mountings in many instances employed colored lenses or lenses of the so-called light polarizing type.

The present invention is directed particularly to overcoming the necessity of having available separate and complete mountings of the above character. This is accomplished through the provision of a single lens supporting structure and the provision of lenses possessing different characteristics such as those set forth above so formed and provided with connection means that the said lenses may be interchangeably used with the single lens supporting structure. This, according to the present invention, is accomplished through the forming of the lenses to a controlled contour shape and size which will blend properly with the parts of the supporting structure and through the provision of detachable connection means whereby the lenses may be selectively assembled with the supporting structure and be held in proper relation therewith.

A further feature of the present invention is to provide connection means which require no independent and detachable parts.

Referring more particularly to the drawings wherein like characters of reference designate like parts throughout the several views, the device embodying the invention as shown in Figs. 1, 2, and 3 comprises a main lens supporting structure embodying a bar-like bridge portion 1 to which rim sections 2 are rigidly attached by soldering, welding or the like. The rim sections 2 are shaped throughout the major portion of the length thereof to follow substantially the upper contour shape of the lenses in the rear thereof and terminate on the nasal sides thereof in connection means 3 and on the temporal sides thereof in outwardly and rearwardly extending temple connection end portions 4 to which suitable temples 5 are pivotally connected in the conventional manner.

The connection means 3 is in the form of a rectangular tubular member or housing 4 secured to the front side surface of the rim section 2 as by soldering, welding, or the like as illustrated at 5b. The rectangular tubular member or housing 4 has a longitudinal slot 5a in the outer side wall thereof as illustrated best in Fig. 2. The slot 5a communicates with the hollow bore of the rectangular tubular member or housing 4 and the said bore has an inner tapered surface 6 therein and on the side opposite the slot 5a. The surface 6 tapers inwardly and in a downward direction as shown best in Fig. 3. The wall 7 having the inner tapered surface 6 formed thereon is recessed at its upper end, as illustrated at 8, and has a longitudinal groove 9 therein (Figs. 2 and 3). Inwardly of the longitudinal groove 9, there is positioned a blade spring 10 which is secured to the wall 7 by screws, rivets or the like 11 adjacent the lower end of the blade spring. The said blade spring, adjacent its upper end, is provided with an inwardly deflected lip 12 having a slight under-taper 13 adjacent its free end. The spring is adapted to flex in an outwardly direction and as diagrammatically illustrated by the dash lines 14. This outward flexing of the spring is to permit a wedge-shaped block 15 carried by the shoe 16 to be placed inwardly of the tapered bore of the tubular member 4. The block 15 is provided with a tapered side surface to wedgingly engage with the tapered surface 6 when moved to its innermost position within said tubular member 4 and the end 12 is adapted to latch over the upper end wall of the block 15 to lock the block in position within said tubular member or housing 4. A reduced neck 17 connects the block 15 with the shoe 16 and is of such a controlled width as to be readily received within the longitudinal slot 5a. The shoe 16 is carried by a lens strap 18 which, as shown in Figs. 2 and 3, comprises a pair of spaced ears 19 having connection openings therein aligned with a connection opening 20 formed in a lens 21 positioned between said ears 19. The connection opening 20 is adapted to receive a tubular member 22 formed of a cushioning material such as plastic, fiber, synthetic rubber or the like. A screw or other suitable connecting means 23 is extended through a perforation 24 formed in one of the ears and is adapted to be threadedly connected in a suitable threaded opening 25 formed in the other of said ears. If desired, a pin and tube type connection means such as is commonly used in the art might be used instead of the screw.

Secured to the lens supporting structure substantially at the point of joinder of the rectangular tubular member 4 and nasal end of the rim section 2 and extending rearwardly thereof are suitable nose pad supporting arms 26 having nose pads 27 pivotally connected therewith. The said arms 26 are secured to the supporting structure by soldering, welding or other suitable means.

The function of the above device is substantially as follows:

Each of the lenses of the various pairs which possess different optical characteristics which are intended for use with the lens supporting structure is provided with a lens strap 18 having a wedge block 15 thereon. This constitutes a part of the connection means whereby the lenses may be quickly and easily assembled with the lens supporting structure and may be readily detached therefrom for interchangement of lenses when desired. The rectangular tubular member or housing 4 carried by the lens supporting structure constitutes the other part of the connecting means and when placing a pair of lenses in assembled relation with the lens supporting structure, all that is necessary is to flex the spring latch member 12 in an outward direction as shown by the dash lines 14 in Fig. 3, then slide the wedge block 15 into assembled relation with the rectangular tubular member or housing 4 and upon releasing the spring latch member 12, the end thereof will move into overlying relation with the top of the wedge block and will firmly retain the parts in connected relation with each other.

The wedge block 15 functioning cooperatively with the tapered wall 6 rigidly supports the lenses in aligned relation with the associated parts of the lens supporting structure and by reason of the fact that the tubular member or housing 4 is of rectangular shape as is the wedge block 15, there will be no tendency for the lenses to move out of proper aligned relation with each other. When it is desired to interchange the lenses, all that is necessary is to move the latch member clear of the upper end of the wedge block, withdraw the block from the said housing and slip another pair of lenses into position.

It is particularly pointed out that no separate connection means are required.

In Fig. 4, there is illustrated a structure generally similar to that illustrated in Figs. 2 and 3 with the exception that the lens strap or lens connection means embodies only a single ear member 28. The rectangular tubular member or housing 4 is secured to a shoe 29 formed on said strap similar to the shoe 16 and to which the wedge block 15 is secured by means of the neck portion 17 and which is adapted to extend through the longitudinal slot 5a when the wedge block is positioned in connected relation with the tubular member or housing 4.

The latch member 12 locks the wedge block in position as described in connection with Figs. 2 and 3.

The lens 21 is secured to the ear 28 by means of a screw or the like 30 which extends through the opening 20 in the lens and is threadedly connected as illustrated at 31 to the strap ear 28. The screw extends through a washer 32 which overlies the surface of the lens opposed to the surface engaged by the perforated end 33 of the ear 28. The device functions in a manner identical to that of the construction illustrated in Figs. 2 and 3.

In Fig. 5, there is shown a slight modification wherein the lens 21, instead of having a lens strap connection therewith, is supported within a lens rim 34 in which instance the wedge block 15' is carried by the rim.

The rim 34 may be of any of the commonly known conventional type and preferably has a V-shaped groove therein adapted to overlie a bevelled edge formed on the contour of the lens. It may be provided with a split rim connection or may be expanded by heat and allowed to cool and shrink about the contour of the lens in the conventional manner.

From the foregoing, it will be apparent that simple, efficient and economical means have been provided for accomplishing all of the objects and advantages of the invention, particularly that of providing simple and efficient means whereby a plurality of lenses having different optical and prescriptive characteristics may be interchangeably used with a single lens supporting structure.

I claim:

1. An ophthalmic mounting comprising a pair of lenses and a support therefor, said support embodying a bridge having portions on its opposed sides to which temples may be connected and having a pair of spaced depending portions disposed intermediate the lenses, said depending portions each having a hollow portion with an open top, and said lenses each having a block portion on their nasal side adapted to be extendable through said open top and into the interior of said hollow portions, the interior of said hollow portions having a downwardly tapered wall, and said block portion being of a wedge shape corresponding substantially to the shape of said interior of the hollow portions so as to fit snugly therein, and having a resilient spring member secured to said hollow portions with a portion to overlie said open top whereby the lenses may be held in fixed related positions and in readily detachable assembly with the support.

2. An ophthalmic mounting comprising a lens supporting structure and a plurality of lenses having different optical characteristics for interchangeable use with said structure, said lens supporting structure comprising a bridge having on its opposed sides portions shaped to follow substantially the upper contour shape of the lenses to which temples may be pivotally connected and having depending portions shaped substantially to follow the nasal contour edges of the lenses, vertically disposed connection members secured to said depending portions, said connection members each having an open top and a slotted side wall communicating with a hollow downwardly tapered internal portion of rectangular cross-section, and said lenses having connection means on the nasal sides thereof each embodying a member secured to a respective lens, a reduced neck portion on said member of a size and shape to extend through said slotted side wall and a wedge block carried by said neck portion adapted to be positioned through said open top internally of the connection member so as to fit snugly therein with the neck lying within the slot in the side wall and a resilient spring member carried by each of said connection members having a portion to overlie said open top for securing the wedge block in position therein.

3. A lens supporting structure for use with the lenses of an ophthalmic mounting, said supporting structure embodying a bridge having portions on its opposed sides to which temples may be connected and having a pair of spaced depending portions disposed to be positioned intermediate the lenses and adjacent the nasal sides thereof, said depending portions each having a hollow portion with an open top and a vertically disposed slot in a side wall communicating with the interior thereof, said interior of the hollow portions having a downwardly tapered shape, and lens holding means for connection with said lenses, said lens holding means each embodying a rim having a lens receiving groove for receiving the peripheral edge of a lens, a block portion on their nasal side positionable through said open top and into the interior of a respective hollow portion and a reduced portion intermediate the lens rim and block portion, said reduced portion being of a size and shape to fit in said vertically disposed slot, and said block portion being of a wedge shape corresponding substantially to the shape of said interior of the hollow portions so as to fit snugly therein with the reduced portion in said slot, and resilient spring means to overlie said open top of the hollow portion whereby lenses when held by said holding means may be maintained in fixed related positions and in readily detachable assembly with the depending portions of said supporting structure.

4. A lens supporting structure of the character described for use with a pair of lenses in an ophthalmic mounting, said structure comprising a bridge member carrying temple supporting portions on its opposed sides which are shaped to follow the upper contour shape of lenses to be assembled therewith and terminating in temple hinge connections, said bridge further having depending portions shaped to follow the nasal side contour of said lenses, said depending portions each supporting an open-top hollow member extending substantially in the direction of said depending portions, the interior of which has a length several times its width and having a downwardly tapered shape, said hollow members further having on their lens-edge-directed side a slot communicating with the top of the hollow member, said slot being of a width less than the width of said interior and extending downwardly in the direction of the length of said hollow member, and a pair of lens holding members, each having a portion for connection with a respective lens and a wedge shaped portion for insertion through the top of said hollow member and being of a shape and length to substantially intimately fit and have a long bearing contact with the opposed surfaces of the interior thereof, said wedge shaped portion being joined with said connection portion by an intermediate portion of reduced section, and said intermediate portion being of a shape to lie within said slot in the side of the hollow member whereby when lenses are connected with the lens holding members, the lenses and holding members as units may be readily assembled or separated from the remaining portion of the structure without disturbing the relation of the bridge and temples and otherwise dissembling the parts of the structure.

5. A lens supporting structure of the character described for the lenses of an ophthalmic mounting comprising a bridge member having temple supporting portions on its opposed sides which are shaped to follow the upper contour shape of said lenses and terminating in temple hinge connections, said bridge further having depending portions shaped to follow the nasal side contour of said lenses, a pair of lens holding members and interfitting means carried by said depending portions of the bridge and the adjacent portion of the respective lens holding members, one of said interfitting means embodying an open-top hollow member extending substantially in the direction of said depending portions, the interior of which has a length several times its width and having a downwardly tapered shape, said hollow member further having a slot communicating with the top of the hollow member, said slot being of a width less than the width of the interior and extending in a direction downwardly of the length thereof, and the other interfitting means having a part connected with the respective portion and a wedge shaped part for insertion through the top of said hollow member and being of a shape and length to substantially intimately fit and have long bearing contact with the opposed surfaces of the interior thereof, said wedge shaped part being joined with said connection part by an intermediate part of reduced section, and said intermediate part being of a shape to extend through said slot in the side of the hollow member whereby the lens holding members may be readily assembled or separated from the remaining portion of the structure without disturbing the relation of the bridge and temples and otherwise dissembling the parts of the structure.

6. An ophthalmic mounting of the character described comprising a pair of spaced lenses, a bridge member disposed intermediate said lenses and carrying temple supporting portions on its opposed sides which are shaped to follow the upper contour shape of said lenses and terminating in temple hinge connections, said bridge further having depending portions shaped to follow the nasal side contour of said lenses, and interfitting means carried by said depending portions of the bridge and the adjacent nasal portion of the respective lenses, one of said interfitting means embodying an open-top hollow member extending substantially in the direction of said depending portions, the interior of which is generally of rectangular shape and has a length several times its width, one wall of said hollow member having a vertically disposed slot communicating with the top of the hollow member and the interior thereof, said slot being of a width less than the width of the interior and extending downwardly in the direction of the length thereof, the opposed wall of said hollow member having an inner downwardly tapered surface and the interfitting means carried by the other portion having a part connected with the respective portion and a wedge shaped part for insertion through the top of said hollow member and being of a shape and length to substantially intimately fit and have long bearing contact with the surfaces of the interior thereof, said wedge shaped part being joined with said connection part by an intermediate part of reduced section, and said intermediate part being of a shape to extend through said slot in the side of the hollow member whereby the lenses may be readily assembled or separated from the remaining portion of the structure without disturbing the relation of the bridge and temples and otherwise dissembling the parts of the structure.

ARPAD GEZA de REVEY.

REFERENCES CITED

The following references are of record in the file of this patent:

UNITED STATES PATENTS

| Number | Name | Date |
|---|---|---|
| 1,003,539 | Squier | Sept. 19, 1911 |
| 1,017,579 | Nicol | Feb. 13, 1912 |
| 1,031,228 | Bader | July 2, 1912 |
| 2,051,543 | Colliander | Aug. 18, 1936 |
| 2,051,544 | Colliander | Aug. 18, 1936 |
| 2,091,296 | Williams | Aug. 31, 1937 |
| 2,244,922 | Ruud | June 10, 1941 |
| 2,250,243 | Williams | July 22, 1941 |
| 2,261,525 | Rips | Nov. 4, 1941 |
| 2,352,973 | Riller | July 4, 1944 |
| 2,366,659 | Uhlemann et al. | Jan. 2, 1945 |
| 2,382,980 | Eaton et al. | Aug. 21, 1945 |
| 2,383,572 | Splaine et al. | Aug. 28, 1945 |
| 2,458,963 | Stevens | Jan. 11, 1949 |

FOREIGN PATENTS

| Number | Country | Date |
|---|---|---|
| 600,163 | Great Britain | Apr. 1, 1948 |